(12) United States Patent
Liu et al.

(10) Patent No.: US 10,727,694 B2
(45) Date of Patent: Jul. 28, 2020

(54) WIRELESS CHARGING DEVICE, PORTABLE CONTAINER, AND WIRELESS CHARGING TERMINAL

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Junhuan Liu, Beijing (CN); Tianxiao Zhao, Beijing (CN); Ruifeng Yang, Beijing (CN); Huaxu Yang, Beijing (CN); Tong Li, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/089,539

(22) PCT Filed: Feb. 7, 2018

(86) PCT No.: PCT/CN2018/075554
§ 371 (c)(1),
(2) Date: Sep. 28, 2018

(87) PCT Pub. No.: WO2018/205699
PCT Pub. Date: Nov. 15, 2018

(65) Prior Publication Data
US 2019/0348861 A1    Nov. 14, 2019

Related U.S. Application Data

(60) Provisional application No. PCT/CN2018/075554, filed on Feb. 7, 2018.

(30) Foreign Application Priority Data

May 8, 2017 (CN) .................... 2017 2 0502407 U

(51) Int. Cl.
*H02J 50/10*     (2016.01)
*H01F 27/08*     (2006.01)
(Continued)

(52) U.S. Cl.
CPC ............ *H02J 50/10* (2016.02); *H01F 27/08* (2013.01); *H01F 38/14* (2013.01); *H02J 7/025* (2013.01)

(58) Field of Classification Search
CPC .. H02J 50/10; H02J 50/00; A45C 3/00; A45C 11/00; A45C 15/00; A45F 3/00; A45F 4/00
(Continued)

(56) References Cited

U.S. PATENT DOCUMENTS 8,553,408 B2 * 10/2013 Supran ................. G06F 1/1632
                                                361/679.02
9,941,731 B1 * 4/2018 Waters-Murphy ...... H02J 50/10
(Continued)

FOREIGN PATENT DOCUMENTS

| CN | 104027130 | 9/2014 |
| CN | 104270990 | 1/2015 |
| CN | 206712510 | 12/2017 |

OTHER PUBLICATIONS

International Search Report and Written Opinion of the International Searching Authority for corresponding PCT Application No. PCT/CN2018/075554 (Foreign Text, 11 pages; English Translation, 5 pages) (May 17, 2018).

*Primary Examiner* — Rexford N Barnie
*Assistant Examiner* — Joseph N Inge
(74) *Attorney, Agent, or Firm* — Myers Bigel, P.A.

(57) ABSTRACT

The present application discloses a wireless charging device. The wireless charging device comprises: a portable con- (Continued)

tainer, the portable container being provided with an induction coil and a mounting base for mounting a mobile device, when the mobile device is mounted in the mounting base, the induction coil and the mobile device forming a closed loop; and a wireless charging terminal, the wireless charging terminal comprising an electrified coil, the electrified coil being electrified with an alternating current so as to generate a magnetic field, when the induction coil is located in the magnetic field, an induction current will be generated in the induction coil and the mobile device can be charged.

13 Claims, 2 Drawing Sheets

(51) Int. Cl.
*H01F 38/14* (2006.01)
*H02J 7/02* (2016.01)

(58) Field of Classification Search
USPC .......................................................... 307/104
See application file for complete search history.

(56) References Cited

U.S. PATENT DOCUMENTS

| | | | |
|---|---|---|---|
| 2009/0224722 A1* | 9/2009 | Causey | A45C 15/00 320/101 |
| 2010/0201312 A1* | 8/2010 | Kirby | H02J 7/025 320/108 |
| 2010/0244768 A1* | 9/2010 | Ghabra | H02J 50/10 320/108 |
| 2014/0000771 A1* | 1/2014 | Sherman | A45C 3/06 150/106 |
| 2015/0015196 A1* | 1/2015 | Ormesher | H02J 7/0045 320/108 |
| 2015/0070880 A1 | 3/2015 | Giunti et al. | |
| 2016/0190817 A1* | 6/2016 | Hartelt | H02J 7/0044 307/104 |

* cited by examiner

WIRELESS CHARGING DEVICE, PORTABLE CONTAINER, AND WIRELESS CHARGING TERMINAL

CROSS REFERENCE TO RELATED APPLICATIONS

The present application is a 35 U.S.C. 371 national stage application of PCT International Application No. PCT/CN2018/075554, filed on Feb. 7, 2018, which claims the benefit of Chinese patent application No. 201720502407.3, filed on May 8, 2017, the contents of which are incorporated herein by reference in their entireties.

TECHNICAL FIELD

The present application relates to the technical field of charging devices, in particular to a wireless charging device.

BACKGROUND

At present, people use mobile devices very frequently, such that the mobile devices have to be charged regularly.

The charging method for the mobile device in the prior art is mainly wired charging, i.e., connecting the mobile device to the socket through a charging wire. On the one hand, this charging method is limited by the number of spare sockets, on the other hand, the user has to connect the mobile device to the socket specially, which is inconvenient for use.

SUMMARY

Some embodiments of the present application provide a wireless charging device. The wireless charging device comprises: a portable container, the portable container being provided with an induction coil and a mounting base for mounting a mobile device, the induction coil and the mobile device forming a closed loop in response to the mobile device being mounted in the mounting base; and a wireless charging terminal, the wireless charging terminal comprising an electrified coil, the electrified coil being electrified with an alternating current so as to generate a magnetic field, wherein an induction current will be generated in the induction coil and the mobile device can be charged in response to the induction coil being located in the magnetic field.

In some embodiments, the mounting base is provided with a plurality of contact terminals. At least two of the plurality of contact terminals are connected with two terminals of the induction coil respectively. Each contact terminal is in contact with a wafer on the mobile device in response to the mobile device being mounted in the mounting base.

In some embodiments, the wireless charging terminal further comprises an iron core, and the electrified oil winds around the iron core.

In some embodiments, the wireless charging terminal further comprises a fixing base. One terminal of the iron core is fixed on the fixing base, and the other terminal is higher than or level to a joint of the iron core and the fixing base. The electrified coil winds around a position on the iron core close to the fixing base, and the iron core is capable of passing through the induction coil.

In some embodiments, the fixing base is provided with a heat sink for dissipating heat from the induction coil hanging over the iron core.

In some embodiments, the heat sink is a fan. The number of the fan is two, and the two fans are arranged at upper and lower sides of the iron core respectively.

In some embodiments, the portable container is a bag. The bag comprises a bag body and a bag strap. The induction coil is arranged on the bag strap. The mounting base is arranged in the bag body, and the two terminals of the induction coil are both connected with the mounting base through leads.

In some embodiments, the bag strap is made of a heat insulation material, and the bag body is provided with a heat dissipating structure.

In some embodiments, the heat dissipating structure is graphite or metal.

In some embodiments, the number of the induction coil is two.

In some embodiments, a display is arranged on an outer side of the portable container. The display is connected with the mobile device in the mounting base for displaying quantity of electricity of the mobile device.

In some embodiments, the display comprises a plurality of LED indicators. The display hangs over the outer side of the portable container.

Some embodiments of the present application provide a portable container. The portable container comprises an induction coil and a mounting base for mounting a mobile device. The induction coil and the mobile device form a closed loop in response to the mobile device being mounted in the mounting base.

In some embodiments, the mounting base is provided with a plurality of contact terminals. At least two of the plurality of contact terminals are connected with two terminals of the induction coil respectively. Each contact terminal is in contact with a wafer on the mobile device in response to the mobile device being mounted in the mounting base.

In some embodiments, the portable container is a bag. The bag comprises a bag body and a bag strap. The induction coil is arranged on the bag strap. The mounting base is arranged in the bag body, and the two terminals of the induction coil are both connected with the mounting base through leads.

In some embodiments, the bag strap is made of a heat insulation material, and the bag body is provided with a heat dissipating structure.

Some embodiments of the present application provide a wireless charging terminal. The wireless charging terminal comprises an electrified coil. The electrified coil is electrified with an alternating current so as to generate a magnetic field. The wireless charging terminal further comprises an iron core. The electrified coil winds around the iron core.

In some embodiments, the wireless charging terminal further comprises a fixing base. One terminal of the iron core is fixed on the fixing base, and the other terminal is higher than or level to a joint of the iron core and the fixing base. The electrified coil winds around a position on the iron core close to the fixing base, and the iron core is capable of passing through the induction coil.

In some embodiments, the fixing base is provided with a heat sink for dissipating heat from the induction coil hanging over the iron core.

In some embodiments, the heat sink is a fan. The number of the fan is two, and the two fans are arranged at upper and lower sides of the iron core respectively.

DETAILED DESCRIPTION

In the following, the technical solutions in the embodiments of the application will be described clearly and completely in connection with the drawings in the embodiments of the application. Obviously, the described embodiments are only part of the embodiments of the application, and not all of the embodiments. Based on the embodiments in the application, all other embodiments obtained by those of ordinary skills in the art under the premise of not paying out creative work pertain to the protection scope of the application.

In the description of the present application, it should be understood that the orientation or position relations indicated by the terms such as "center", "upper", "lower", "front", "back", "left", "right", "vertical", "horizontal", "top", "bottom", "inside", "outside" are orientation or position relations based on the illustration of the drawings, which is only for the convenience of describing the present application and simplifying the description, rather than indicating or implying that the indicated device or element must have a particular orientation or must be constructed and operated in the particular orientation, therefore, it could not be understood as limitation to the present application.

In the description of the present application, unless otherwise specified, the meaning of "a plurality of" is two or more than two.

In the description of the present application, it should be noted that unless otherwise specified and defined explicitly, the terms of "mounting", "connected with", "connecting" should be understood extensively, for example, it can be either a fixed connection, or a detachable connection, or an integrated connection. It can be either a mechanical connection or an electrical connection. It can be a direct connection or an indirect connection through a medium. It can be internal connection of two elements. For the ordinary skilled person in the art, the specific meanings of the above terms in the present application can be understood based on specific conditions.

Figure 1:
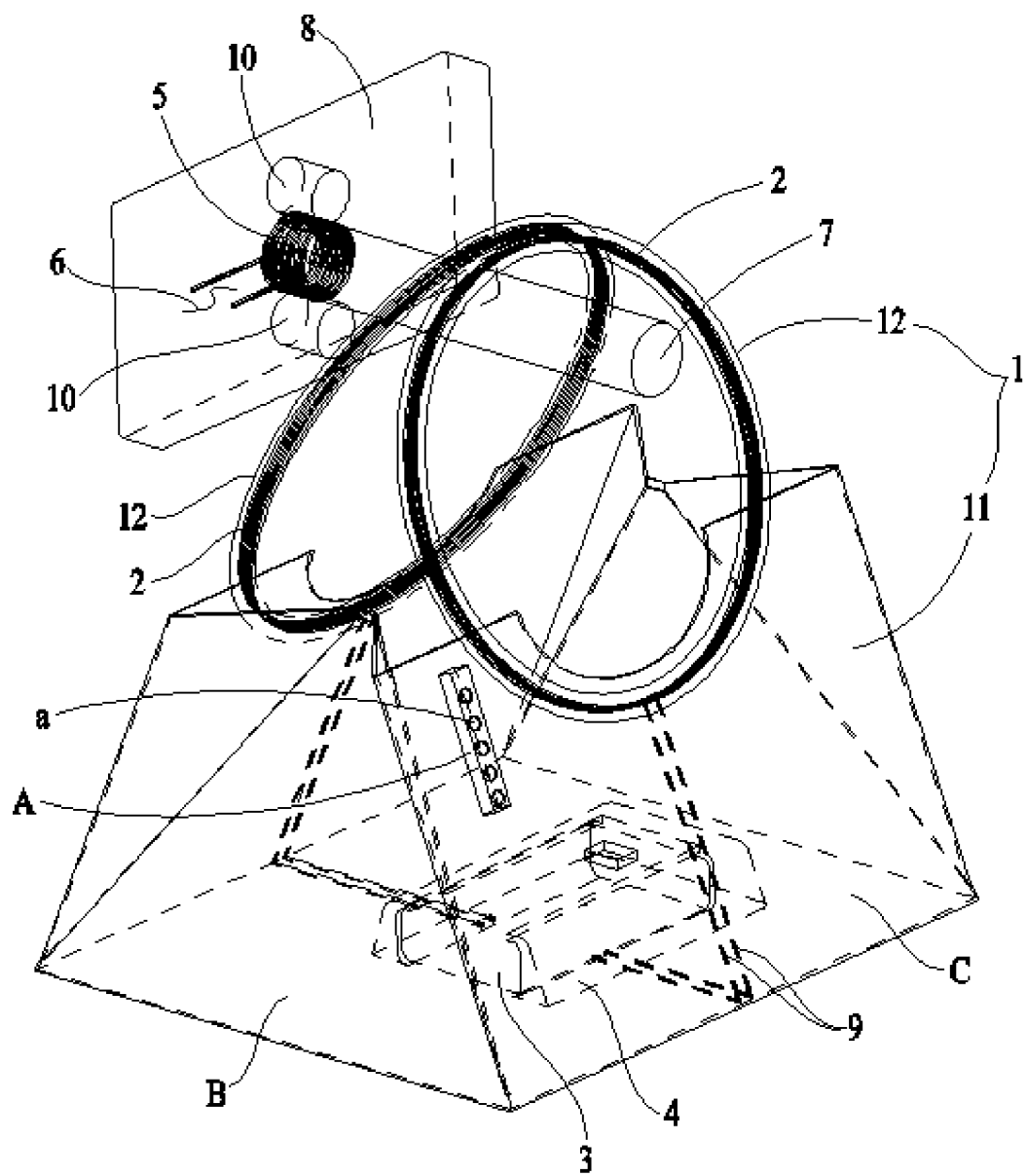
FIG. 1 is a structural schematic view of a wireless charging device according to an embodiment of the present application.
Figure 2:
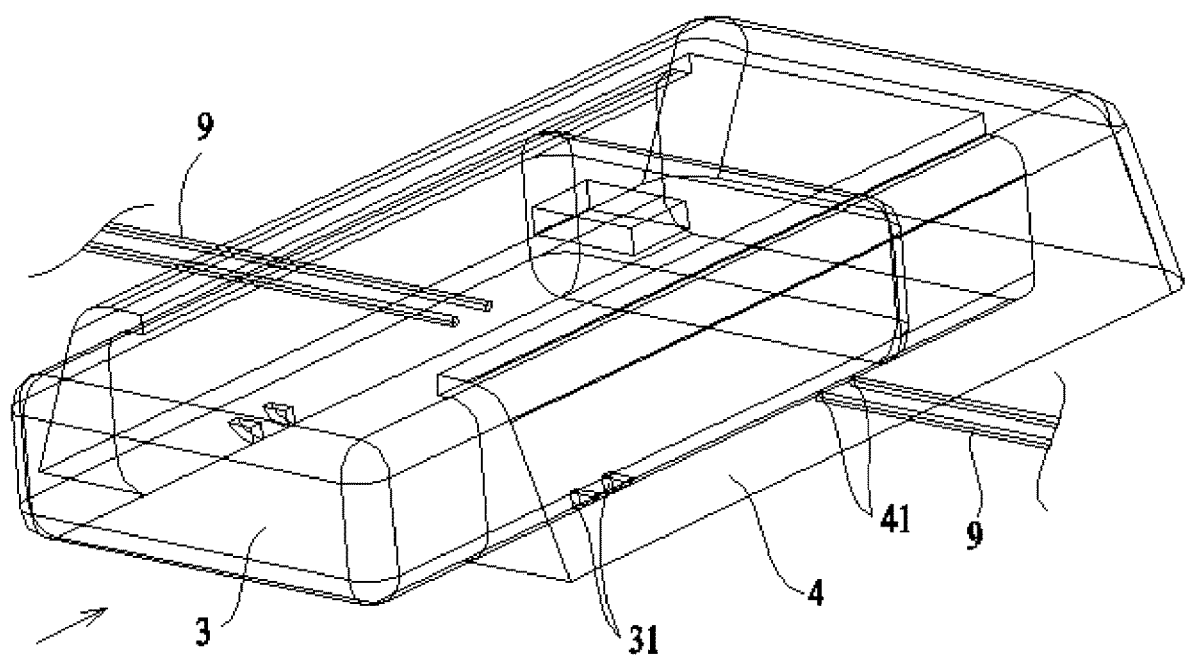
FIG. 2 is a schematic view of a mounting base and a mobile device in FIG. 1.

Referring to FIG. 1 and FIG. 2, embodiments of the present application provide a wireless charging device. The wireless charging device comprises a portable container 1, and the portable container 1 is provided with an induction coil 2 and a mounting base 4 for mounting a mobile device 3. When the mobile device 3 is mounted in the mounting base 4, the induction coil 2 and the mobile device 3 in the mounting base 4 form a closed loop. The wireless charging device further comprises a wireless charging terminal. The wireless charging terminal comprises an electrified coil 5. The electrified coil 5 can be electrified with an alternating current so as to generated a magnetic field. When the induction coil 2 is located in the magnetic field, an induction current is generated in the induction coil 2, and the mobile device 3 can be charged.

The wireless charging device provided by the embodiments of the present application comprises a portable container 1. The portable container 1 herein can be a bag or an accessory, etc. People are accustomed to place the mobile device 3 in the portable container 1 for the convenience of carrying. The portable container 1 is provided with an induction coil 2 and a mounting base 4 for mounting the mobile device 3. The induction coil 2 and the mobile device 3 in the mounting base 4 can form a closed loop. The mobile device 3 herein can be a mobile electronic device such as a mobile phone, and can also be a mobile power supply for charging the mobile electronic device. The mobile device 3 can be mounted in the mounting base 4 along the direction as shown by the arrow in FIG. 2. When the mobile device is a mobile power supply, the mobile power supply can charge the mobile electronic device as long as it is taken out from the mounting base 4. The wireless charging device further comprises a wireless charging terminal. The wireless charging terminal comprises an electrified coil 5. The electrified coil 5 can be electrified with an alternating current so as to generate a magnetic field. The alternating current power supply 6 in FIG. 1 is used to provide an alternating current for the electrified coil 5. When the induction coil 2 is located in the magnetic field, an induction current can be generated in the induction coil 2 so as to charge the mobile device 3. Hence, the electrified coil 5 can be arranged at a position where the portable container 1 is generally placed, so as to enable the induction coil 2 on the portable container 1 to be located in the magnetic field generated by the electrified coil 5 through the habitual action of the user, thereby achieving the purpose of charging the mobile device 3 using the idle time of the portable container 1, so that the user does not have to connect the mobile device 3 with the socket specially, which is convenient for use. In addition, the wireless charging device provided by the embodiments of the present application does not need to be connected with the socket, hence, it would not be limited by the number of the spare sockets, which is also convenient for use.

In order to improve stability of the connection, referring to FIG. 2, in one embodiment, the mounting base 4 is provided with a plurality of contact terminals 41. At least two of the plurality of contact terminals 41 are connected with two terminals of the induction coil 2 through leads 9 respectively. For example, if the number of the induction coil 2 is one, the number of the contact terminal 41 will be two; if the number of the induction coil 2 is two, the number of the contact terminals 41 will be four. The contact terminal 41 can comprise a spring (not shown in the figure). When the mobile device 3 is mounted in the mounting base 4, each contact terminal 41 is in elastic contact with an elastic wafer 31 on the mobile device 3, so as to enable each induction coil 2 to form a closed loop with the mobile device 3 in the mounting base 4. Because inelastic contact may have the problem of poor contact with the increase of the number of use, compared with the inelastic contact, this embodiment avoids the problem of poor contact through the elasticity of the contact terminal 41, so as to improve the stability of the connection.

In order to improve the charging efficiency, in some embodiments, the wireless charging terminal further comprises an iron core 7. The iron core 7 herein is made of a magnetic substance with strong magnetic conductivity. The electrified coil 5 winds around the iron core 7, thus the magnetic field can be enhanced significantly, thereby increasing the current generated in the induction coil 2, so as to improve the charging efficiency.

The wireless charging device of the present application charges the mobile device 3 using the electromagnetic induction principle: a magnetic field can be generated by applying an alternating current of a certain frequency on the electrified coil 5, and a certain current will be generated in the induction coil 2 located in the magnetic field due to the electromagnetic induction.

The basic formula of electromagnetic induction:

$$u = N\frac{d\phi}{dt}$$

For the sinusoidal alternating current, the magnetic flux is $\phi=B_m \sin \omega t S$, wherein, $\omega=2\pi f$, which is substituted into the basic formula of electromagnetic induction to obtain $u=2\pi fNB_m S \cos \omega t$.

Wherein, f is the power supply frequency, N is the number of turns of the coil, $B_m$ is the density of the magnetic flux, S is the sectional area of the magnetic flux.

From the formula $u=2\pi fNB_m S \cos \omega t$, it can be seen that the increase of the sectional area of the magnetic flux S can increase the induction electromotive force u, and the charging efficiency will be increased accordingly. Hence, in some embodiments, the wireless charging terminal can further comprise a fixing base 8. The fixing base 8 can be fixed on a wall or other objects. One terminal of the iron core 7 is fixed on the fixing base 8, the other terminal is higher than or level to the joint of the iron core 7 and the fixing base 8. The electrified coil 5 winds around a position on the iron core 7 close to the fixing base 8, thus the iron core 7 can serve as a structure for hanging the portable container 1, so as to ensure that the portable container 1 hangs over the iron core 7 and would not drop. It could be understood that the iron core 7 can also be in a hook shape, as long as it can ensure that the portable container 1 hangs over the iron core 7 and would not drop. When the portable container 1 hangs over the iron core 7, the iron core 7 passes through the induction coil 2, in this case, the sectional area of the magnetic flux s is the maximum, correspondingly, the induction electromotive force u is the maximum, thereby improving the charging efficiency to the most extent.

The portable container 1 can be a bag. Compared with clothing, the bag does not have to be washed frequently, which can reduce damage to the induction coil 2 and the mounting base 4. In addition, the capacity of the bag is relatively large, which is convenient for arranging the mounting base 4. The bag comprises a bag body 11 and a bag strap 12. The induction coil 2 is arranged on the bag strap 12. Specifically, the induction coil 2 can be arranged in the bag strap 12, and can also wind around the bag strap 12. The mounting base 4 is arranged in the bag body 11. The two terminals of the induction coil 2 are both connected with the mounting base 4 through leads 9. The leads 9 are placed in the bag body 11. When the bag hangs over the iron core 7 through the bag strap 12, the iron core 7 passes through the induction coil 2, in this case, the sectional area of the magnetic flux s is the maximum, correspondingly, the induction electromotive force u is the maximum, thereby improving the charging efficiency to the most extent.

In some embodiments, the wireless charging terminal does not comprise the iron core, as long as the portable container 1 is placed in the vicinity of the wireless charging terminal, and the induction coil 2 on the portable container 1 is located in the magnetic field generated by the electrified coil 5, the purpose of charging the mobile device 3 can be achieved by using the idle time of the portable container 1.

When a current is generated in the induction coil 2, the induction coil 2 will generate heat, which may result in an over-high temperature of the bag strap 12. In order to avoid the problem, referring to FIG. 1, the fixing base 8 is provided with a heat sink 10. The heat sink 10 is used for dissipating heat from the bag strip 12 hanging over the iron core 7, thus the over-high temperature of the bag strap 12 can be avoided.

The heat sink 10 can be a fan, so as to realize heat dissipation and cooling using convection of air. The number of the fan will influence the heat dissipation effect to the bag strap 12. The larger the number is, the better the heat dissipation effect to the bag strap 12 will be. However, if the number is too large, the cost of the wireless charging device will be too high. Hence, in one embodiment, the number of the fan is two, the two fans are arranged at upper and lower sides of the iron core 7 respectively. Thus, on the one hand, heat dissipation can be performed to the bag strap 12 at the upper and lower sides of the iron core 7, so as to improve the heat dissipation effect, on the other hand, the problem of over-high cost caused by too many fans can be avoided.

The heat sink 10 can be an endothermic or thermal conductive material, such as graphene sheet, which can be attached on the fixing base 8.

The number of the induction coil 2 will influence the charging efficiency. The larger the number is, the higher the charging efficiency will be. However, if the number is too large, the cost of the wireless charging device will be too high. Hence, in one embodiment, the number of the induction coil 2 is two, on the one hand, the charging efficiency can be improved, on the other hand, the over-high cost can be avoided.

For the convenience of use, referring to FIG. 1, a display A is arranged on the outer side of the portable container 1. The display A is connected with the mobile device 3 in the mounting base 4 for displaying the quantity of electricity of the mobile device 3. Thus, the dump energy of the mobile device 3 or the quantity of electricity of the mobile device 3 that has been charged can be checked through the display A directly, and the mobile device 3 does not have to be taken out from the portable container 1, which is convenient for use.

Referring to FIG. 1, the display A comprises a plurality of LED indicators a. The display A can hang over the outer side of the portable container 1. Such a setting manner of hanging the display A makes the manufacturing process to be simpler.

The induction coil 2 can be arranged in the bag strap 12, so as to prevent it from being in contact with the human body, thereby avoiding damage to the human body caused by leakage of electricity of the induction coil 2, and also avoiding bad experience brought by heat generation of the induction coil 2. The bag strap 12 can be made of a heat insulation material, which can further avoid bad experience brought by heat generation of the induction coil 2. The bag body 11 can also be provided with a heat dissipating structure (not shown in the figure), so as to facilitate heat dissipation. The heat dissipating structure herein can be a material with strong heat dissipation capability, e.g., graphite, metal, and can also be a material of a low specific heat capacity, so as to avoid excessive heat accumulation, and can also be a heat radiation hole, etc. Specifically, the material with strong heat dissipation capability can be arranged in the two sides B of the bag body 11, and the material of a low specific heat capacity can be arranged in the two front sides C of the bag body 11.

The above embodiments are only used for explanations rather than limitations to the present application, the ordinary skilled person in the related technical field, in the case of not departing from the spirit and scope of the present application, may also make various modifications and variations, therefore, all the equivalent solutions also belong to the scope of the present application, the patent protection scope of the present application should be defined by the claims.

The invention claimed is:

1. A wireless charging device, comprising:
   a portable container comprising an induction coil and a mounting base for mounting a mobile device, wherein the induction coil and the mobile device form a closed loop in response to the mobile device being mounted in the mounting base; and
   a wireless charging terminal comprising an electrified coil configured to be electrified with an alternating current to generate a magnetic field,
   wherein an induction current is generated in the induction coil and the mobile device is charged, in response to the induction coil being in the magnetic field,
   wherein the portable container comprises a bag that comprises a bag body and a bag strap,
   wherein the induction coil is on the bag strap,
   wherein the mounting base is in the bag body,
   wherein two terminals of the induction coil are connected with the mounting base through leads,
   wherein the bag strap is made of a heat insulation material, and
   wherein the bag body comprises a heat dissipating structure.

2. The wireless charging device according to claim 1,
   wherein the mounting base comprises a plurality of contact terminals,
   wherein at least two of the plurality of contact terminals are connected with two terminals of the induction coil respectively, and
   wherein the at least two of the plurality of contact terminals are in contact with a wafer on the mobile device in response to the mobile device being mounted in the mounting base.

3. The wireless charging device according to claim 1,
   wherein the wireless charging terminal further comprises an iron core, and
   wherein the electrified coil winds around the iron core.

4. The wireless charging device according to claim 3,
   wherein the wireless charging terminal further comprises a fixing base,
   wherein a first terminal of the iron core is fixed on the fixing base,
   wherein a second terminal of the iron core is higher than or level to a joint of the iron core and the fixing base,
   wherein the electrified coil winds around a position on the iron core close to the fixing base, and
   wherein the iron core is configured to pass through the induction coil.

5. The wireless charging device according to claim 4, wherein the fixing base comprises a heat sink configured to dissipate heat from the induction coil over the iron core.

6. The wireless charging device according to claim 5,
   wherein the heat sink comprises two fans, and
   wherein the two fans are arranged at upper and lower sides of the iron core respectively.

7. The wireless charging device according to claim 1, wherein the heat dissipating structure comprises graphite or metal.

8. The wireless charging device according to claim 1, wherein the induction coil comprises two induction coils.

9. The wireless charging device according to claim 1,
   wherein a display is on an outer side of the portable container, and
   wherein the display is connected with the mobile device in the mounting base and is configured to display a quantity of electricity of the mobile device.

10. The wireless charging device according to claim 9,
    wherein the display comprises a plurality of LED indicators, and
    wherein the display is over the outer side of the portable container.

11. A portable container, comprising:
    an induction coil; and
    a mounting base for mounting a mobile device,
    wherein the induction coil and the mobile device form a closed loop in response to the mobile device being mounted in the mounting base,
    wherein the portable container comprises a bag that comprises a bag body and a bag strap,
    wherein the induction coil is on the bag strap,
    wherein the mounting base is in the bag body,
    wherein two terminals of the induction coil are connected with the mounting base through leads,
    wherein the bag strap is made of a heat insulation material, and
    wherein the bag body comprises a heat dissipating structure.

12. The portable container according to claim 11,
    wherein the mounting base comprises a plurality of contact terminals,
    wherein at least two of the plurality of contact terminals are connected with at least two terminals of the induction coil respectively,
    wherein the at least two of the plurality of contact terminals are in contact with a wafer on the mobile device in response to the mobile device being mounted in the mounting base.

13. A wireless charging terminal, comprising:
    an electrified coil configured to be electrified with an alternating current to generate a magnetic field; and
    an iron core,
    wherein the electrified coil is wound around the iron core,
    wherein the wireless charging terminal further comprises:
    a fixing base,
    wherein a first terminal of the iron core is fixed on the fixing base,
    wherein a second terminal of the iron core is higher than or level to a joint of the iron core and the fixing base,
    wherein the electrified coil winds around a position on the iron core close to the fixing base,
    wherein the iron core is configured to pass through an induction coil,
    wherein the fixing base comprises a heat sink configured to dissipate heat from the induction coil over the iron core,
    wherein the heat sink comprises two fans, and
    wherein the two fans are at upper and lower sides of the iron core respectively.

* * * * *